United States Patent [19]
Duffin

[11] Patent Number: 6,017,077
[45] Date of Patent: Jan. 25, 2000

[54] TRUCK BED CAP WINDOW LOCK SYSTEM

[76] Inventor: Robert W. Duffin, 8760 S. 36TH St., Scotts, Mich. 49088

[21] Appl. No.: 09/048,674

[22] Filed: Mar. 26, 1998

[51] Int. Cl.⁷ ....................................................... B60P 7/02
[52] U.S. Cl. .................... 296/100.02; 296/163; 296/106; 49/394; 49/449; 292/DIG. 29
[58] Field of Search .......................... 296/56, 106, 146.8, 296/146.15, 163, 164, 100.02; 292/144, DIG. 29; 70/277, 282, 90, 227; 49/394, 395, 449

[56] References Cited

U.S. PATENT DOCUMENTS

| | | | |
|---|---|---|---|
| 3,636,745 | 1/1972 | Green | 292/144 X |
| 4,225,164 | 9/1980 | Wensley et al. | 292/144 X |
| 4,431,228 | 2/1984 | Grise | 296/146.15 X |
| 5,004,287 | 4/1991 | Doyle | 292/DIG. 29 X |
| 5,072,984 | 12/1991 | Jackson | 296/56 |
| 5,532,521 | 7/1996 | Leininger | 292/144 X |

*Primary Examiner*—D. Glenn Dayoan
*Assistant Examiner*—Chad D. Wells

[57] ABSTRACT

A truck bed cap window lock system is provided including a cap mounted over a truck bed and having a window. Also included is at least one locking assembly having a lock housing coupled to an interior surface of a periphery of the window. Each locking assembly further includes a solenoid mounted to an interior surface of the cap adjacent to the associated window. The transducer has a first orientation for precluding the opening of the corresponding window and a second orientation for allowing the opening of the corresponding window. A control panel is included for selectively transferring the transducer between the first and second orientations thereof.

6 Claims, 2 Drawing Sheets

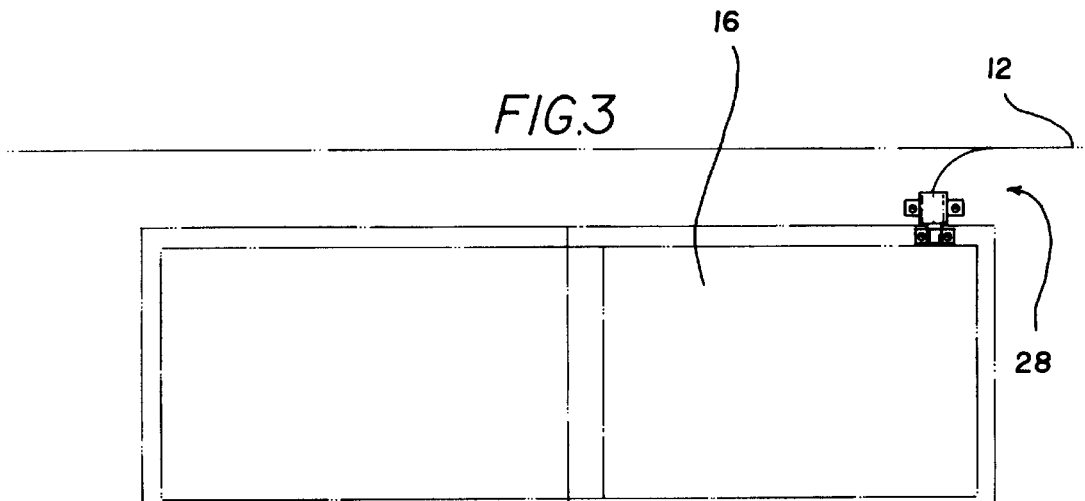
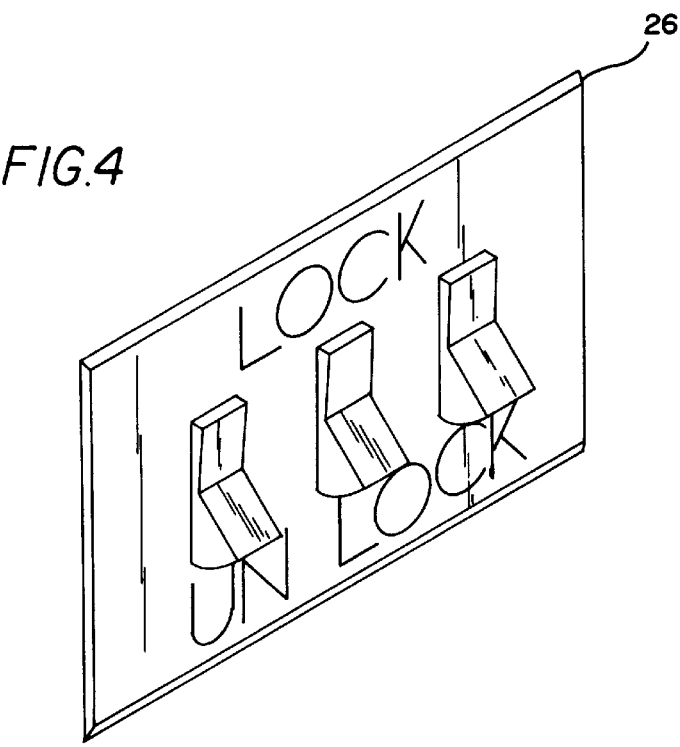

TRUCK BED CAP WINDOW LOCK SYSTEM

BACKGROUND OF THE INVENTION

1. Field of the Invention

The present invention relates to vehicular door locks and more particularly pertains to a new or used truck bed cap window lock system for selectively precluding the opening of windows of a truck bed cap.

2. Description of the Prior Art

The use of vehicular door locks is known in the prior art. More specifically, vehicular door locks heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicular door locks include U.S. Pat. No. 5,328,218; U.S. Pat. No. 5,180,198; U.S. Pat. No. 4,962,652; U.S. Pat. No. 4,695,083; U.S. Pat. No. 5,236,234; and U.S. Pat. Des. No. 263,947.

In these respects, the truck bed cap window lock system according to the present invention substantially departs from the conventional concepts and designs of the prior art, and in so doing provides an apparatus primarily developed for the purpose of selectively precluding the opening of windows of a truck bed cap.

SUMMARY OF THE INVENTION

In view of the foregoing disadvantages inherent in the known types of vehicular door locks now present in the prior art, the present invention provides a new or used truck bed cap window lock system construction wherein the same can be utilized for selectively precluding the opening of windows of a truck bed cap.

The general purpose of the present invention, which will be described subsequently in greater detail, is to provide a new or used truck bed cap window lock system apparatus and method which has many of the advantages of the vehicular door locks mentioned heretofore and many novel features that result in a new or used truck bed cap window lock system which is not anticipated, rendered obvious, suggested, or even implied by any of the prior art vehicular door locks, either alone or in any combination thereof.

To attain this, the present invention generally comprises a cap mounted over a truck bed. The cap is equipped with a rear window pivotally coupled to the cap along a top edge thereof and adapted to pivot outwardly. The cap further has a pair of sliding windows each slidably situated within a cut out formed in a corresponding side face of the cap. Next provided is a plurality of locking assemblies each mounted adjacent to an associated one of the windows. Each locking assembly includes a lock housing formed of a circular portion with a pair of apertured tabs extending from free ends thereof. The apertured tabs are adapted for being screwably coupled to an interior surface of a periphery of an associated one of the windows. Each locking assembly further includes a cylindrical solenoid having a pair of apertured tabs extending therefrom for mounting the solenoid to an interior surface of the cap adjacent to the associated window. For reasons that will soon become apparent, a transducer associated with the solenoid preferably has a frusto-conical shaped configuration. In use, the transducer has an unbiased orientation upon the lack of receipt of power. In such orientation, the same transducer resides within the associated lock housing for precluding the opening of the corresponding window. The transducer further has a biased orientation upon the receipt of power. In the biased orientation, the transducer is removed from the associated lock housing for allowing the opening of the corresponding window. Finally, a control panel is situated within a cab of the truck and has a plurality of toggle switches. Each of such switches is connected to the locking assembly associated with a designated one of the windows. In operation, each toggle switch has a first orientation for providing power to the associated solenoids and a second orientation for precluding the supply of power to the associated solenoids.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new or used truck bed cap window lock system apparatus and method which has many of the advantages of the vehicular door locks mentioned heretofore and many novel features that result in a new or used truck bed cap window lock system which is not anticipated, rendered obvious, suggested, or even implied by any of the prior art vehicular door locks, either alone or in any combination thereof.

It is another object of the present invention to provide a new or used truck bed cap window lock system which may be easily and efficiently manufactured and marketed.

It is a further object of the present invention to provide a new or used truck bed cap window lock system which is of a durable and reliable construction.

An even further object of the present invention is to provide a new or used truck bed cap window lock system which is susceptible of a low cost of manufacture with regard to both materials and labor, and which accordingly is then susceptible of low prices of sale to the consuming public, thereby making such truck bed cap window lock system economically available to the buying public.

Still yet another object of the present invention is to provide a new or used truck bed cap window lock system which provides in the apparatuses and methods of the prior art some of the advantages thereof, while simultaneously overcoming some of the disadvantages normally associated therewith.

Still another object of the present invention is to provide a new or used truck bed cap window lock system for selectively precluding the opening of windows of a truck bed cap.

Even still another object of the present invention is to provide a new or used truck bed cap window lock system that includes a cap mounted over a truck bed and having a window. Also included is at least one locking assembly having a lock housing coupled to an interior surface of a periphery of the window. Each locking assembly further includes a solenoid mounted to an interior surface of the cap adjacent to the associated window. The transducer has a first orientation for precluding the opening of the corresponding window and a second orientation for allowing the opening of the corresponding window. A control panel is included for selectively transferring the transducer between the first and second orientations thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an illustration of the locking assembly associated with the sliding window of the present invention.

FIG. 4 is a perspective view of the control panel of the present invention.

DESCRIPTION OF THE PREFERRED EMBODIMENT

Figure 1:
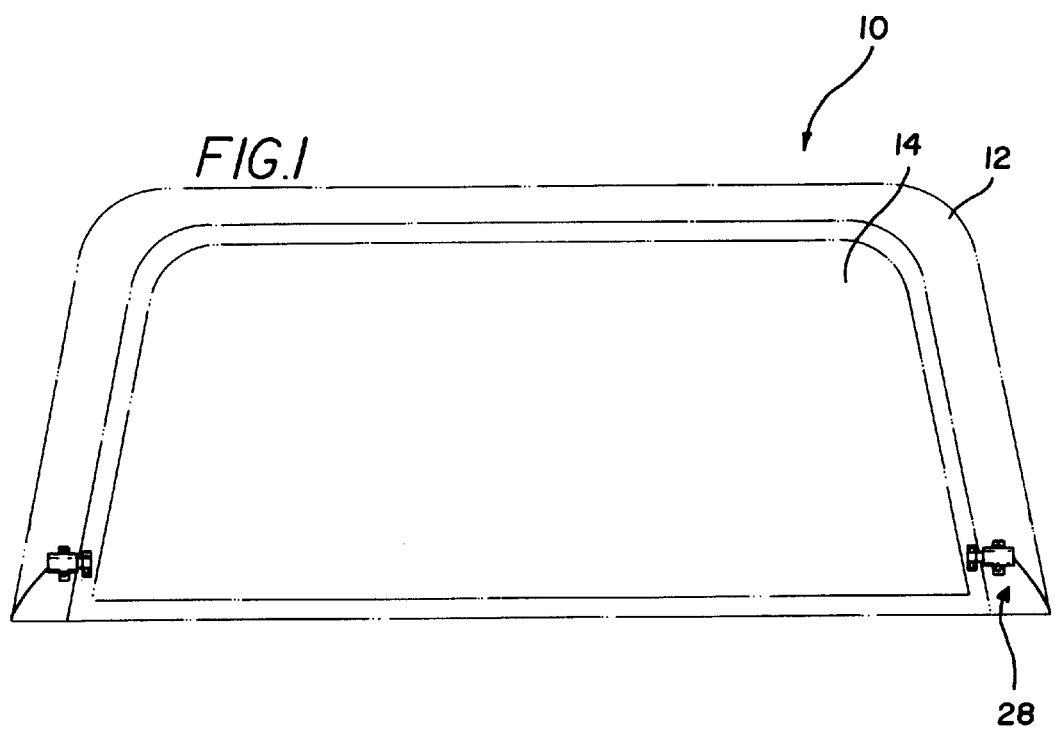
FIG. 1 is a rear view of a new or used truck bed cap window lock system according to the present invention.
Figure 2:
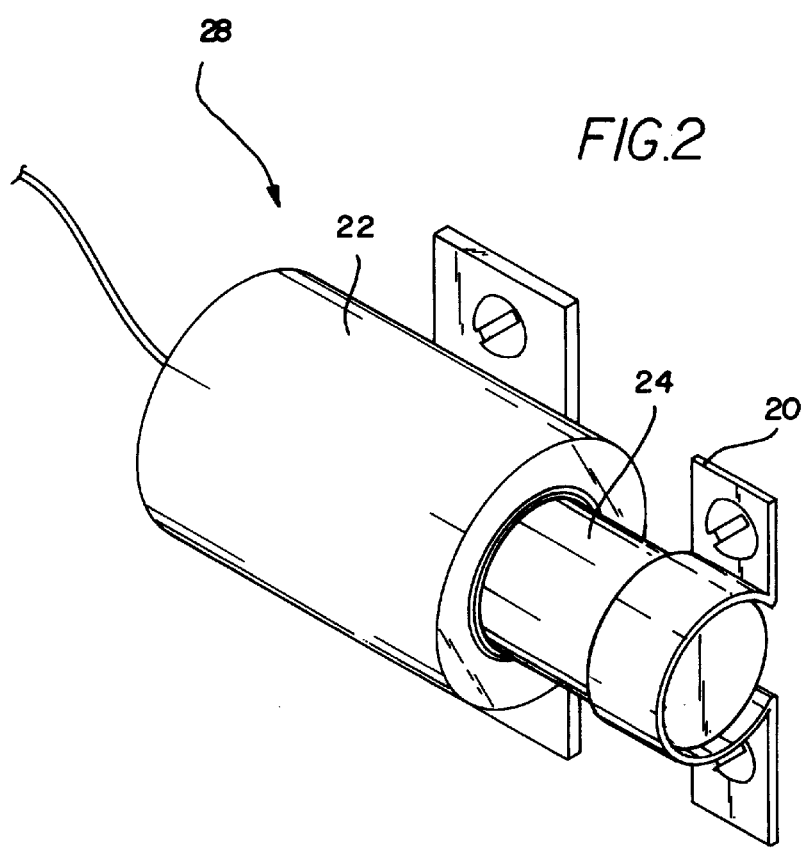
FIG. 2 is a detailed perspective view of one of the locking assemblies of the present invention.

With reference now to the drawings, and in particular to FIGS. 1 through 4 thereof, a new or used truck bed cap window lock system embodying the principles and concepts of the present invention and generally designated by the reference numeral 10 will be described.

The present invention, designated as numeral 10, includes a cap 12 mounted over a truck bed. The cap is equipped with a rear window 14 pivotally coupled to the cap along a top edge thereof and adapted to pivot outwardly. The cap further has a pair of sliding windows 16 each slidably situated within a cut out formed in a corresponding side face of the cap.

Next provided is a plurality of locking assemblies 28 each mounted adjacent to an associated one of the windows. Each locking assembly includes a lock housing 20 formed of a circular portion with a pair of apertured tabs extending from free ends thereof. It should be noted that the circular portion defines a portion of a cylinder. The apertured tabs are adapted for being screwably coupled to an interior surface of a periphery of an associated one of the windows.

Each locking assembly further includes a cylindrical solenoid 22 having a pair of apertured tabs extending therefrom for mounting the solenoid to an interior surface of the cap adjacent to the associated window. Such apertured tabs preferably reside along a tangent of the solenoid. Note FIG. 2. For reasons that will soon become apparent, a transducer 24 of the solenoid preferably has a frusto-conical shaped configuration.

In use, the transducer has an unbiased orientation upon the lack of receipt of power. In such orientation, the same transducer resides within the associated lock housing for precluding the opening of the corresponding window. The transducer further has a biased orientation upon the receipt of power. In the biased orientation, the transducer is removed from the associated lock housing for allowing the opening of the corresponding window. As such, when a power supply of the present invention is cut off, the solenoids default to the unbiased, or relaxed orientation.

As shown in FIG. 1, the solenoids of the rear window are horizontally oriented adjacent to bottom side corners thereof. Further, the solenoids of the side windows are vertically oriented and positioned adjacent to a top edge of the corresponding window. It should be noted that in various alternate embodiments, the locking assemblies may be positioned to accommodate windows having various other configurations. Further, the side faces of the cap of the truck may be equipped with a window and locking assembly similar to that of the rear face.

Finally, a control panel 26 is situated within a cab of the truck and has a plurality of toggle switches. Each of such switches is connected to the locking assembly associated with a designated one of the windows. Such connection is afforded via wires which are run along the bed and into the cab and secured in place by way of clips. An unillustrated pair of separable contacts are preferably mounted on both the cap and the bed for allowing the convenient removal of the cap from the bed.

In operation, each toggle switch has a first orientation for providing power to the associated solenoids and a second orientation for precluding the supply of power to the associated solenoids. As an option, a light may be situated adjacent to each switch for illuminating when power is available and the associated transducer is its locked unbiased orientation. Yet another option would be to provide a removably cover or the like to prevent the toggle switches from being inadvertently bumped to the first orientation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A truck bed cap window lock system comprising, in combination:

a cap mounted over a truck bed and having a rear window pivotally coupled to the cap along a top edge thereof and adapted to pivot outwardly, the cap further having a pair of sliding windows each slidably situated within a cut out formed in a corresponding side face of the cap;

a plurality of locking assemblies each mounted adjacent to an associated one of the windows, each locking assembly including a lock housing formed of a circular portion with a pair of apertured tabs extending from free ends thereof for being screwably coupled to an interior surface of a periphery of an associated one of the windows, each locking assembly further including a cylindrical solenoid having a pair of apertured tabs extending therefrom for mounting the solenoid to an interior surface of the cap adjacent to the associated window and having a latching bar, the latching bar having an unbiased orientation upon the lack of receipt of power wherein the same resides within the associated lock housing for precluding the opening of the corresponding window and a biased orientation upon the receipt of power wherein the latching bar is removed from the associated lock housing for allowing the opening of the corresponding window; and a control panel situated within a cab of the truck and having a plurality of toggle switches each connected to the locking assembly associated with a designated one of the windows, each toggle switch having a first orientation for providing power to the associated solenoids and a second orientation for precluding the supply of power to the associated solenoids.

2. A truck bed cap window lock system comprising:

a cap mounted over a truck bed and having a window;

at least one locking assembly including a lock housing coupled to an interior surface of a periphery of the window, each locking assembly further including a solenoid mounted to an interior surface of the cap adjacent to the associated window, wherein the window is a rear pivoting window, a latching bar of the solenoid having a first orientation for precluding the opening of the corresponding window and a second orientation for allowing the opening of the corresponding window; and control means for selectively transferring the latching bar between the first and second orientations thereof.

3. A truck bed cap window lock system as set forth in claim 2 wherein the window is a side sliding window.

4. A truck bed cap window lock system as set forth in claim 2 wherein the control means is situated within a cab of the truck.

5. A truck bed cap window lock system as set forth in claim 2 wherein the control means includes a control panel with a toggle switch.

6. A truck bed cap window lock system as set forth in claim 2 wherein the first orientation of the latching bar is unbiased and the second orientation of the latching bar is biased.

* * * * *